US010877833B2

United States Patent
Stephens

(10) Patent No.: US 10,877,833 B2
(45) Date of Patent: Dec. 29, 2020

(54) VECTOR ATOMIC MEMORY UPDATE INSTRUCTION

(71) Applicant: ARM LIMITED, Cambridge (GB)

(72) Inventor: Nigel John Stephens, Cambridge (GB)

(73) Assignee: ARM Limited, Cambridge (GB)

( * ) Notice: Subject to any disclaimer, the term of this patent is extended or adjusted under 35 U.S.C. 154(b) by 16 days.

(21) Appl. No.: 16/070,592

(22) PCT Filed: Dec. 15, 2016

(86) PCT No.: PCT/GB2016/053948
§ 371 (c)(1),
(2) Date: Jul. 17, 2018

(87) PCT Pub. No.: WO2017/125709
PCT Pub. Date: Jul. 27, 2017

(65) Prior Publication Data
US 2019/0026173 A1   Jan. 24, 2019

(30) Foreign Application Priority Data

Jan. 20, 2016 (GB) .................................. 1601036.5

(51) Int. Cl.
*G06F 11/00* (2006.01)
*G06F 11/07* (2006.01)
(Continued)

(52) U.S. Cl.
CPC ........ *G06F 11/079* (2013.01); *G06F 9/30036* (2013.01); *G06F 9/30043* (2013.01);
(Continued)

(58) Field of Classification Search
CPC .............. G06F 11/0727; G06F 11/073; G06F 11/1008; G06F 11/2053; G06F 11/079;
(Continued)

(56) References Cited

U.S. PATENT DOCUMENTS

| 4,777,593 A | 10/1988 | Yoshida |
| 6,085,334 A * | 7/2000 | Giles ...................... G11C 29/40 |
| | | 714/30 |

(Continued)

FOREIGN PATENT DOCUMENTS

| CN | 102508776 | 9/2014 |
| KR | 10-2015-0137129 | 12/2015 |

(Continued)

OTHER PUBLICATIONS

International Search Report and Written Opinion of the ISA for PCT/GB2016/053948, dated Mar. 7, 2017, 10 pages.
(Continued)

*Primary Examiner* — Sarai E Butler
(74) *Attorney, Agent, or Firm* — Nixon & Vanderhye P.C.

(57) ABSTRACT

Processing circuitry (85) supports a vector atomic memory update instruction identifying an address vector, for triggering at least one atomic memory update operation for performing an atomic memory update to a memory location having an address determined based on a corresponding active data element of the address vector. When a fault condition is determined for the address determined using a given faulting active data element of the address vector, atomic memory update operations for that element and any subsequent element in a predetermined sequence are suppressed. If the faulting element is the first active data element in the sequence, a fault handling response is triggered, while otherwise the fault handling response is suppressed and status information is stored indicating which element is the faulting element.

19 Claims, 6 Drawing Sheets

(51) Int. Cl.
*G06F 9/30* (2018.01)
*G06F 9/38* (2018.01)

(52) U.S. Cl.
CPC .......... *G06F 9/3861* (2013.01); *G06F 9/3865* (2013.01); *G06F 9/3887* (2013.01); *G06F 11/073* (2013.01); *G06F 11/0751* (2013.01); *G06F 11/0787* (2013.01); *G06F 11/0793* (2013.01)

(58) Field of Classification Search
CPC ........ G06F 11/07; G06F 11/00; G06F 11/008; G06F 11/1064; G06F 11/1072
USPC .......................................................... 714/53
See application file for complete search history.

(56) References Cited

U.S. PATENT DOCUMENTS

| | | | |
|---|---|---|---|
| 2010/0325483 A1* | 12/2010 | Gonion | G06F 8/4441 714/10 |
| 2012/0191944 A1* | 7/2012 | Gonion | G06F 9/30018 711/217 |
| 2013/0339327 A1* | 12/2013 | Belmar | G06F 13/24 707/703 |
| 2014/0164709 A1* | 6/2014 | Guthrie | G06F 12/0804 711/134 |
| 2014/0208086 A1 | 7/2014 | Bradbury et al. | |
| 2014/0244987 A1 | 8/2014 | Garbacea et al. | |

FOREIGN PATENT DOCUMENTS

| | | |
|---|---|---|
| TW | 201546610 | 12/2015 |
| WO | 2013/095608 | 6/2013 |

OTHER PUBLICATIONS

Combined Search and Examination Report for GB1601036.5, dated Jun. 28 2016, 5 pages.
Kumar et al., "Atomic Vector Operations on Chip Multiprocessors", International Symposium on Computer Architecture, 2008 International Symposium on Computer Architecture, Jun. 21-25, 2008, 12 pages.
Office Action for TW Application No. 106100673 dated Aug. 13, 2020 and English translation, 16 pages.

* cited by examiner

VECTOR ATOMIC MEMORY UPDATE INSTRUCTION

This application is the U.S. national phase of International Application No. PCT/GB2016/053948 filed 15 Dec. 2016, which designated the U.S. and claims priority to GB Patent Application No. 1601036.5 filed 20 Jan. 2016, the entire contents of each of which are hereby incorporated by reference.

The present technique relates to the field of data processing. More particularly, it relates to processing of a vector atomic memory update instruction.

Some data processing apparatuses may support vector processing in which a given processing operation may be performed on each data element of a vector to generate corresponding data elements of a result vector. This allows a number of different data values to be processed with a single instruction, to reduce the number of program instructions required to process a given number of data values. Vector processing can also be referred to as SIMD (single instruction, multiple data) processing.

At least some examples provide an apparatus comprising: processing circuitry to trigger at least one atomic memory update operation in response to a vector atomic memory update instruction identifying an address vector comprising a plurality of data elements including at least one active data element, each atomic memory update operation comprising an atomic update to a memory location having an address determined based on a corresponding active data element of the address vector; wherein: the data elements of the address vector have a predetermined sequence; in response to detecting a fault condition for the address determined based on a faulting active data element of said address vector, the processing circuitry is configured to suppress the atomic memory update operation for said faulting active data element and any subsequent active data element in the predetermined sequence; when said faulting active data element is a first active data element in said predetermined sequence, the processing circuitry is configured to trigger a fault handling response; and when the faulting active data element is an active data element other than said first active data element in said predetermined sequence, the processing circuitry is configured to suppress the fault handling response and to store status information indicating which data element of the address vector is the faulting active data element.

At least some examples provide a data processing apparatus comprising: means for performing at least one atomic memory update operation in response to a vector atomic memory update instruction identifying an address vector comprising a plurality of data elements including at least one active data element, each atomic memory update operation comprising an atomic update to a memory location having an address determined based on a corresponding active data element of the address vector; wherein: the data elements of the address vector have a predetermined sequence; in response to detecting a fault condition for the address determined based on a faulting active data element of said address vector, the means for performing is configured to suppress the atomic memory update operation for said faulting active data element and any subsequent active data element in the predetermined sequence; when said faulting active data element is a first active data element in said predetermined sequence, the means for performing is configured to trigger a fault handling response; and when the faulting active data element is an active data element other than said first active data element in said predetermined sequence, the means for performing is configured to suppress the fault handling response and to store status information indicating which data element of the address vector is the faulting active data element.

At least some examples provide a data processing method comprising: triggering at least one atomic memory update operation in response to a vector atomic memory update instruction identifying an address vector comprising a plurality of data elements including at least one active data element, each atomic memory update operation comprising an atomic update to a memory location having an address determined based on a corresponding active data element of the address vector, wherein the data elements of the address vector have a predetermined sequence; in response to detecting a fault condition for the address determined based on a faulting active data element of said address vector, suppressing the atomic memory update operation for said faulting active data element and any subsequent active data element in the predetermined sequence; when said faulting active data element is a first active data element in said predetermined sequence, triggering a fault handling response; and when the faulting active data element is an active data element other than said first active data element in said predetermined sequence, suppressing said fault handling response and storing status information indicating which data element of the address vector is the faulting active data element.

At least some examples provide a computer program stored on a computer readable storage medium that, when executed by a data processing apparatus, provides a virtual machine which provides an instruction execution environment corresponding to the apparatus as described above.

Further aspects, features and advantages of the present technique will be apparent from the following description of examples, which is to be read in conjunction with the accompanying drawings, in which:

FIG. 1 schematically illustrates an example of a data processing apparatus supporting vector processing;

Figure 1:
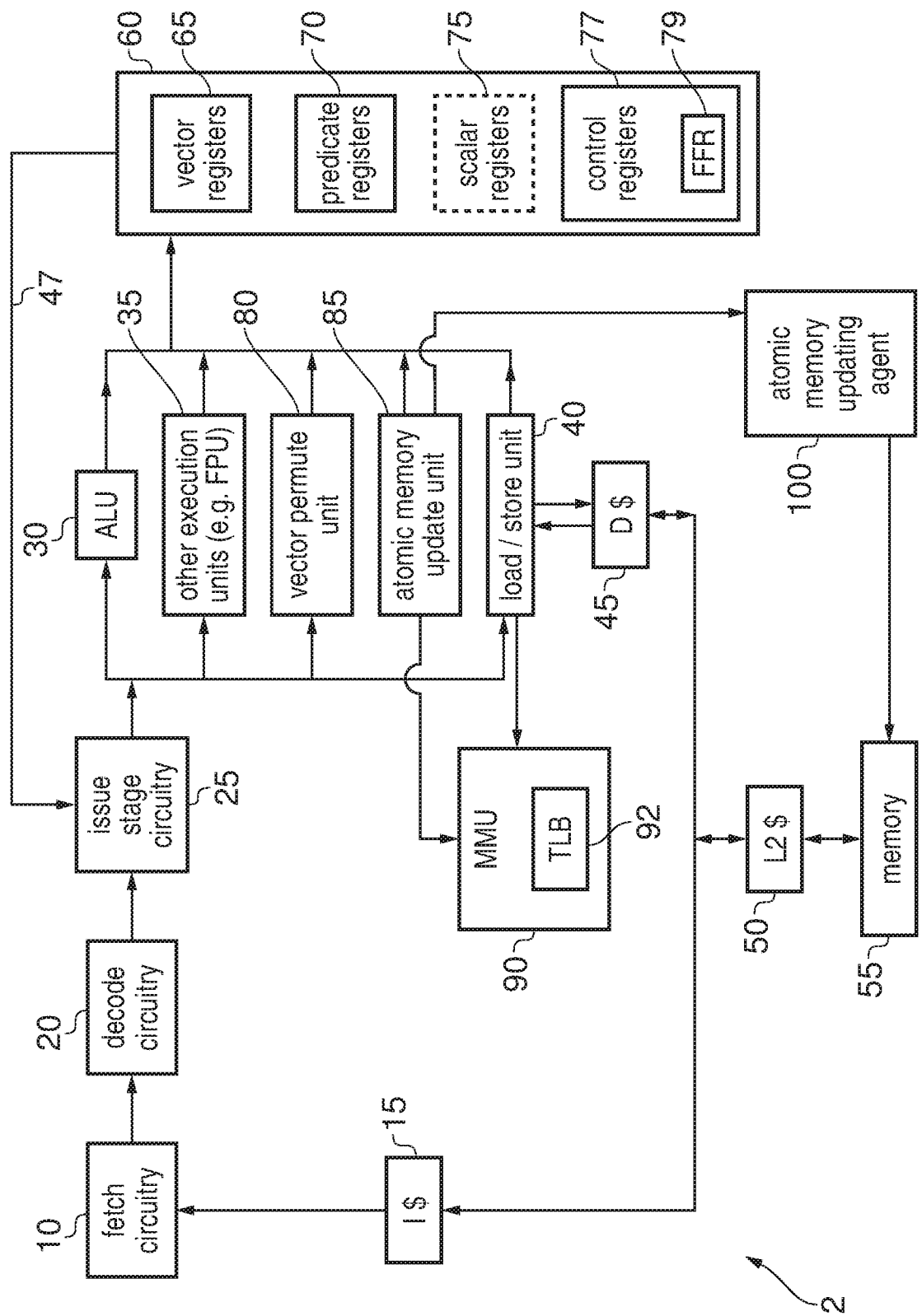

Some specific examples are discussed below. It will be appreciated that the invention is not limited to these examples.

A data processing apparatus may support a vector atomic memory update instruction which identifies an address vector including a number of data elements including at least one active data element. In response to the vector atomic memory update instruction, the processing circuitry may trigger at least one atomic memory update operation. Each atomic memory update operation may comprise an atomic update to a memory location having an address determined based on their corresponding active data element of the address vector.

An atomic update to a memory location may be an update operation which is observed as being performed indivisibly with respect to any other processors or agents within the system which may be simultaneously attempting to modify the same memory location. Atomic updates can be useful for example when a number of processes or agents in a system each are updating a common set of locations in memory. In some cases, such updates may be performed by reading the previous value stored in the memory location, performing some operation on the read value to generate the updated value, and writing back the updated value, and with non-atomic updates, there could be a risk that in the period between a first process reading out the value from the memory location and the first process writing the updated value back to the memory location, a second process could also read the memory location, so that the update performed by the first process may not be considered by the second process and when the second process writes its updated value to the memory location then the update performed by the first process may effectively be lost. This problem can be avoided by providing atomic updates which are observed as being performed indivisibly. For example, either one of the first and second processes/agents may be selected to carry out its atomic update first and the other process/agent may have to wait until the first update completes before reading out the value. This can avoid updates being lost due to a race between competing read, modify and write operations performed by respective processors or agents.

A vector atomic memory update instruction can be useful because it can allow atomic memory update operations to a number of memory locations to be triggered by a single instruction, improving code density not only in the instructions for performing the actual atomic memory update operations, but also in reducing the overhead of determining the addresses for which the updates should be performed. By allowing a single instruction to specify an address vector comprising a number of data elements for determining corresponding addresses of memory locations to be updated, this can avoid the need for unpacking the address elements and marshalling the atomic memory updates through a sequence of scalar atomic memory update instructions, which can be less efficient. Also, the vector atomic memory update instruction may allow performance improvements because the hardware is aware of several addresses to be processed at a time, and so may be able to coalesce updates to a given memory location, e.g. if several of the addresses corresponding to the address vector map to the same memory location or cache line for example.

However, one issue with implementing a vector atomic memory update instruction is that it is possible for a fault condition to arise for one or more of the addresses determined based on corresponding data elements of the address vector. For example, one of the addresses may cause a translation fault because it could correspond to a currently unmapped virtual address, or could correspond to a region of memory which the currently executing process does not have permission to access. The usual way to handle address faults may be to trigger a fault handling response, such as a trap to the operating system to repair the cause of the fault, and then to restart execution of the instruction which triggered the fault. However, for a vector atomic memory update instruction, it may not be safe to restart the instruction again because some of the atomic updates performed in response to the vector instruction may already have been performed before the fault was detected for another element of the address vector, and repeating these already performed updates could lead to incorrect results. For example, one form of vector atomic memory update instruction could trigger an increment to each memory location whose address is determined based on corresponding active data elements of the address vector, and so incrementing the same memory location twice, once before the fault was detected and again after restarting the instruction, would give the wrong result. Hence, standard techniques for dealing with address faults may not be suitable for vector atomic memory update instructions.

The data elements of the address vector may be assumed to have a predetermined sequence. In response to detecting a fault condition for the address determined based on a particular active data element of the address vector (this element will be referred to as the "faulting active data element"), the processing circuitry may suppress the vector atomic memory update operation for the faulting active data element and any subsequent active data element in the predetermined sequence. When the faulting active data element is the first active data element in the predetermined sequence, then the processing circuitry may trigger a fault handling response. However, when the faulting active data element is an active data element other than the first active data element in the predetermined sequence, then the processing circuitry may suppress the fault handling response and store status information indicating at least which data elements of the address vector is the faulting active data element.

This approach means that execution of the vector atomic memory update instruction can be safely restarted following a fault without risk of performing a given atomic memory update operation twice. The fault handling response is performed when the first active data element triggers a fault, and in that case the atomic memory update operations for the first active data element and any subsequent active data element in the sequence (i.e. all the active data elements) will be suppressed, so none of the memory update operations will actually have taken place and so it is safe to restart the instruction fully later. On the other hand, when an active data element other than the first active data element faults, then the fault handling response is not triggered and instead some status information can be stored to indicate which data element of the address vector is the faulting active data element. This status information can then be used to restart the vector atomic memory update instruction later so that the memory update operations for already completed elements are not performed again. As discussed below there may be different ways in which the status information can be used for this purpose. As long as the first active data element does not encounter a fault condition, then there may be some forward progress since at least the first active data element can successfully carry out its atomic memory update. Hence, over a series of attempts to execute the vector atomic memory update instruction, any faults can be resolved and forward progress can be made.

In some implementations, all elements of the address vector could be considered active data elements and there may not be any means for the system to indicate certain elements as inactive.

However, in other systems there may be some control information which specifies which data elements of the address vector are active or inactive. For example, a mask could be provided when a series of bits indicating which data elements are active elements. This can be useful for example because sometimes the number of different addresses for which atomic updates are to be performed may not be an exact multiple of the vector length. This can be handled using the mask, with at least one instance of the vector atomic memory update instruction being executed with the mask indicating as inactive certain elements of the vector for which there are not enough addresses to fill the entire vector. The mask can also be referred to as a "predicate". The terms mask and predicate will be used interchangeably in this application.

The processing circuitry may be responsive to at least one further instruction to generate, based on the status information, at least one a new address vector and a new mask for a subsequent attempt to execute a vector atomic memory update instruction. For example, either the address vector or the mask of the previous vector atomic memory update instruction can be modified so that the faulting active data element becomes the first active data element for the subsequent attempt to execute a vector atomic memory update instruction. For example, the status information could be used to modify the mask so that the faulting active data element stays in the same position within the vector but is now indicated as the first active data element in the predetermined sequence. For example any elements preceding the faulting active data element could now be indicated as inactive because their atomic updates were already successfully completed. Alternatively, the address vector itself could be modified so that elements of the previous address vector are moved so that they are now at positions corresponding to the first active data elements and subsequent elements indicated by the old mask. The programmer may for example implement a loop surrounding the vector atomic memory update instruction and the at least one further instruction, so that if there is a fault then depending on the status information the mask or address vector for the instruction can be modified and then the vector atomic memory update instruction may be reattempted with the new mask or address vector. The loop can repeat until all of the active elements have successfully been completed.

The status information could be represented in different ways. In some cases the status information may simply be an indication of the element number of the faulting active data element.

However, a particularly useful way of representing the status information may be to provide a fault mask which comprises fault indications having a first value for at least one data element preceding the faulting active data element in the predetermined sequence, and fault indications having a second value for the faulting active data elements and any subsequent active data elements in the predetermined sequence. This form of status information is useful because it can simplify modifying the mask for the vector atomic memory update instruction in dependence on the status information in order to generate the new mask for a subsequent attempt to execute the instruction. For example the fault mask could simply be combined with the mask for the vector atomic memory update instruction using a simple logical operation (e.g. AND) or arithmetic operation (e.g. a subtraction) in order to generate the new mask.

Also, a fault mask of this type can be useful because the vector atomic memory update instruction may be just one of a series of instructions which execute operations using the values whose addresses are specified by the address vector, and so if there is a fault on one of these addresses then some of these other operations may also need to suppressed, not just the atomic memory update operation. By providing a fault mask of this type then the fault mask can be used to derive the mask for other instructions as well and in some cases the fault mask may be accumulated over a series of instructions so that any faulty elements are cleared from the fault mask so that only the remaining successful elements continue to be processed by the series of vector instructions. This means that following the vector atomic memory update instruction, if there is a fault for the faulting active data element, the fault indications for that element and any subsequent element in the sequence may be set to the second value, but it is not necessary that all the preceding elements ahead of the faulting element in the sequence will have the first value in the fault mask, because an earlier instruction could already have cleared those fault indications in the fault mask to the second value if those earlier elements encountered some kind of fault for the earlier instruction.

From the programmers point of view, the vector atomic memory update instruction may trigger atomic memory update operations for each active data element of the address vector. However, there may be different ways of implementing this behaviour in hardware. In some systems, when no fault condition is detected for the address determined based on the first active data element in the sequence, the processing circuitry may trigger the atomic memory update operation to be performed for each active data element of the address vector that precedes any faulting active data element in the sequence. If there are no faulting active data elements then all of the atomic memory update operations for the active data elements could be performed. Hence, in this case the hardware may carry out as many of the atomic memory update operations as possible up to the element which causes a fault, to reduce the number of iterations of the instructions which are required. This approach can be more efficient in terms of performance.

However, in other implementations to simplify the hardware the processing circuitry need not necessarily trigger all the atomic memory update operations for non-faulting elements preceding the faulting active element. For example, the hardware could be limited to carrying out a certain number N of atomic memory updates in response to any given instruction, to limit the overhead in buffering a number of requests for atomic memory updates. Hence, if the active elements require more than N atomic memory updates to be performed, and there is no fault up to this point, then the active element which would require an $(N+1)^{th}$ atomic memory update operation to be performed may be determined as faulting irrespective of the value of that element of the address vector. Hence, when the limit to the number of active elements that can be processed in one iteration of the instruction is reached, the next active data element can be marked as faulty and the status information can be set to indicate that element as the faulty element, even if the actual address associated with that element would not actually trigger a fault. Subsequent attempts to execute the vector atomic memory update instruction may then restart from the next active data element previously found to be faulty, for example by modifying the mask or the address vector in the ways discussed above. Note that in some cases more than one element of the vector may be processed with a single atomic memory update operation (e.g. updates to the same cache line may be coalesced), so sometimes the limit of N atomic memory updates may be reached after more than N elements of the vector have been processed. Other implementations may not support coalescing of requests and so in that case, the $(N+1)^{th}$ active element could always be considered to be faulty if no previous element has faulted. In some cases, N=1, so that the second active element of the address vector is always marked as faulty if the first active element does not fault. In this case, the atomic memory update operations may effectively be serialised since at most there will be only one successful atomic memory update per iteration of the instruction. This can provide a simple implementation with the lowest circuit overhead. From a programmer's point view, the same program can be executed regardless of whether the hardware limits how many updates can be performed in response to a given instruction, with the only difference from the programmers point of view being the performance that can be achieved.

As discussed above, the data elements of the address vector may be considered to have a given predetermined sequence. Any sequence of the data elements may be used. However, a simple approach is for the first active data element in the sequence to be the least significant active data element of the address vector. The sequence can then continue in increasing order of significance of the active data elements. This approach may map best to the way in which programmers tend to populate vectors in practice, since it is common for the least significant addresses to be populated into the least significant data elements of the address vector. However, other implementations could choose different sequences, for example the sequence could be from most significant data element to least significant data element instead, or be a more arbitrary sequence of elements.

The present technique can be used to guard against any kind of fault condition which could arise for the atomic memory update operations. However, in many cases the fault condition may comprise an address translation fault or a memory protection fault. The fault handling response taken by a given implementation may vary. However, one approach may be to trigger execution of the fault handling routine when the fault arises. For example, the fault handling routine could be an exception handler or a routine provided by an operation system for dealing with faults. For example, in the case of an address translation fault the fault handing routine could page in the required translation data for a page of addresses including the address which triggered the fault, or in the case of memory protection fault the fault handling routine may take some action to deal with the violation of security permissions set by a memory protection unit.

In some cases, the address vector may specify absolute addresses for which the atomic memory updates are to be performed. Alternatively, the address vector could specify address offsets in each active data element which are to be added to a base address in order to determine the address of each memory location to be updated. Specifying the addresses indirectly using an offset from a base address can in many cases be more useful, for example to allow the addresses to be calculated using vector elements with fewer bits than if the absolute address was specified in each element of the vector.

In some embodiments, the processing circuitry may be able to perform the atomic memory updates itself.

However, it can often be more efficient to provide memory updating circuitry which is separate from the processing circuitry, to perform the at least one atomic memory update operation in response to the vector atomic memory update instruction. Hence, the processing circuitry may simply issue a request for the memory updating circuitry in order to trigger each atomic memory update operation. To ensure that the instruction can safely be restarted when there is a fault, the processing circuitry could for example suppress issuing of a request to the memory updating circuitry for a given active element of the address vector until it is determined that any preceding data elements in the address vector have not triggered a fault.

Providing separate memory updating circuitry can be particularly advantageous because the memory updating circuitry may be able to perform the atomic update to memory directly in memory without first loading data from the memory location into a cache accessible to the processing circuitry. In contrast, for the processing circuitry to be able to carry out the update it may generally need the value from memory to be read into the cache and then the update performed on the cached copy of the data before writing it back to memory. If there are several agents attempting to perform atomic memory updates simultaneously then this can require many cache line migrations and can waste space in the cache which may be unnecessary because following the updates the data may not be referenced again in the near future. By providing a memory updating agent which can directly update memory without loading data into the cache, the cache can be used more efficiently. Also, this avoids the processing circuitry needing to track which atomic memory updates have completed and avoids incurring overhead in maintaining coherency between the different processes/agents which may be attempting to access the cache. Instead, each process/agent can simply request that the memory updating circuitry updates a given address and then does not need to continue tracking coherency (a 'fire and forget' approach).

The atomic update to a given memory location need not be carried out in a single operation, although this could still be the case. In some cases atomic update could still be performed as separate steps to read a value from memory, modify it and then write the modified value back to memory. The term atomic updates merely indicates that the overall updating process is observed by other processors taking place atomically, but does not require that the actual update is a single atomic operation. Also, the atomic update refers to the update performed for a given address element of the address vector, and does not imply that the updates for the whole vector have to take place atomically. It is perfectly acceptable for other processes to perform updates to memory between successful atomic updates corresponding to different data elements.

There may be different forms of the vector atomic memory update instruction, corresponding to different kinds of updating of the memory location. For example the atomic updates to the memory location could comprise any of the following:

adding or subtracting a given value to or from the value stored to the memory location (e.g. an increment or decrement to the value stored in the memory location);

performing a bitwise logical operation on the value stored in the memory location and at least one further value (for example, AND, OR, XOR or NAND). These kind of bitwise logical operations can for example be useful for clearing or setting certain bits of the value stored in the memory location;

setting the memory location to a minimum or a maximum of the previous value stored in the memory location and at least one further value (by executing a number of such atomic updates using different values of the further value, the value in that location becomes the overall minimum or maximum of all the values which were tested as the further value); and updating the value stored in the memory location if a previous value stored in the memory location meets a predetermined condition (for example the previous value could be compared with another value and replaced with a third value if it equals the other value, or certain bits of the memory location could be tested for some condition and then an update applied if the condition is met).

It will be appreciated that many other kinds of updates could be implemented. Some systems may support two or more types of vector atomic memory update instruction each processed as discussed above, but triggering different kinds of update operation. These instructions could be distinguished by the instruction opcode or by a field specifying the type of operation to be applied to each memory location.

In some cases the update operation may also include loading to a register or a cache a previous value stored in the memory location before the update, and/or a new value stored in the memory location after the update. Hence, in addition to updating the memory, the old or new value could also be returned to a register or cache, so that the processing circuitry can access it.

The present technique can also be implemented using a virtual machine. The virtual machine may be a program which when executed by a host apparatus provides an instruction execution environment for executing instructions so that the host apparatus appears from the programmers point of view as if it has the circuitry discussed above. The host processor need not itself actually have that circuitry, and instead the code of the virtual machine controls the host hardware to execute instructions as if such circuitry was provided. For example the virtual machine may be a computer program stored on a storage medium. The storage medium may be non-transitory.

FIG. 1 is a block diagram of a system in which the techniques of the described embodiments may be employed. In the example shown in FIG. 1, the system takes the form of a pipelined processor. Instructions are fetched from an instruction cache 15 (which is typically coupled to memory 55 via one or more further levels of cache such as a level 2 cache 50) by the fetch circuitry 10, from where they are passed through decode circuitry 20 which decodes each instruction in order to produce appropriate control signals for controlling downstream execution resources within the pipelined processor to perform the operations required by the instructions. The control signals forming the decoded instructions are passed to issue stage circuitry 25 for issuing to one or more execution pipelines 30, 35, 40, 80, 85 within the pipelined processor. The execution pipelines 30, 35, 40, 80, 85 may collectively be considered to form processing circuitry.

The issue stage circuitry 25 has access to the registers 60 in which data values required by the operations can be stored. In particular source operands for vector operations may be stored within the vector registers 65, and source operands for scalar operations may be stored in the scalar registers 75. In addition, one or more predicates (masks) may be stored in predicate registers 70, for use as control information for the data elements of vector operands processed when performing certain vector operations. One or more of the scalar registers may also be used to store data values used to derive such control information for use during performance of certain vector operations.

The register 60 may also include control registers 77 which may include registers for providing configuration information for configuring the operation of the processing pipeline, or status information about the outcomes of processing operations performed by the pipeline. One of the control registers 77 may be a first faulting register (FFR) 79, which will described in more detail later.

The source operands and any associated control information can be routed via a path 47 into the issue stage circuitry, so that they can be dispatched to the appropriate execution unit along with the control signals identifying the operation (s) to be performed to implement each decoded instruction. The various execution units 30, 35, 40, 80 shown in FIG. 1 are assumed to be vector processing units for operating on vector operands, but separate execution units (not shown) can be provided if desired to handle any scalar operations supported by the apparatus.

Considering the various vector operations, arithmetic operations may for example be forwarded to the arithmetic logic unit (ALU) 30 along with the required source operands (and any control information such as a predicate), in order to enable an arithmetic or logical operation to be performed on those source operands, with the result value typically being output as a destination operand for storing in a specified register of the vector register bank 65.

In addition to the ALU 30, other execution units 35 may be provided, for example a floating point unit (FPU) for performing floating point operations in response to decoded floating point instructions, and a vector permute unit 80 for performing certain permutation operations on vector operands. In addition, a load/store unit (LSU) 40 is used for performing load operations in order to load data values from the memory 55 (via the data cache 45 and any intervening further levels of cache such as level 2 cache 50) into specified registers within the register sets 60, and for performing store operations in order to store data values from those registers back to the memory 55.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) may be provided, for example register renaming circuitry to map the architectural registers specified by the instructions to physical registers from a pool of physical registers within the register bank 45 (the pool of physical registers typically being larger than the number of architectural registers), thereby enabling certain hazards to be removed, facilitating more use of out of order processing. In addition, a reorder buffer may typically be provided to keep track of the out of order execution, and to allow the results of the execution of the various instructions to be committed in order.

In the described embodiments, the circuitry of FIG. 1 is arranged to execute vector operations on vector operands stored in the vector registers 65, where a vector operand comprises a plurality of data elements. For certain vector operations performed on such a vector operands (such as arithmetic operations), the required operation may be applied in parallel (or iteratively) to the various data elements within the vector operand. Predicate information (also known as a mask) may be used to identify which data elements within a vector are active data elements for a particular vector operation, and hence are data elements to which the operation should be applied.

As shown in FIG. 1, the execution pipelines may also include an atomic memory update unit 85 for performing atomic memory update operations. While the atomic memory updates (AMU) unit is shown separately from the other execute units in FIG. 1, in other examples the functionality of the AMU unit 85 could be combined with one of the other execute units such as the ALU 30 or load/store unit (LSU) 40. The AMU unit 85 handles processing of atomic memory update (AMU) instructions for triggering atomic updates to one or more locations in memory 55. An external AMU agent 100 is provided for directly updating locations in memory 55 without requiring the data from those locations to be loaded into the caches 45, 50. This avoids polluting the caches with large numbers of temporarily accessed data being updated which may not be likely to referred to frequently again. Also, the external AMU agent 100 can manage the atomic updates to memory being performed indivisibly with respect to other updates so that the processor itself does not need to monitor coherency between competing updates.

Hence, the AMU processing unit 85 may be responsible for determining whether addresses for which atomic updates are to be performed trigger a fault and if not to issue requests to the external AMU agent 100 to perform updates for the request of addresses. A memory management unit (MMU) 90 may be provided for managing access permissions to respective regions of a memory address space. The MMU 90 may have a translation lookaside buffer (TLB) 92 for storing entries defining virtual-to-physical address translations for respective pages of the address space. Also the TLB entries may specify access permissions, for example defining whether the corresponding page is read only or can be written to, or defining which privilege levels of code can access the page. When the LSU 40 or the AMU unit 85 receives an address for which a load, store or atomic update is to be performed, the address is looked up in the TLB 92, and the MMU 90 may return an indication of whether the access is permitted, and if so, a corresponding physical address for the virtual address provided by the LSU 40 or AMU unit 85. If the access is permitted, then the LSU 40 or AMU unit 85 may then trigger an access to the data cache 45 or a request to the AMU agent 100 as appropriate. While FIG. 1 shows an example where a memory management unit 90 is provided, in systems in which instructions may directly specify a physical address a memory protection unit (MPU) could be provided instead which defines access permissions for physically addressed pages of memory (without any virtual-to-physical address translation).

Figure 2:
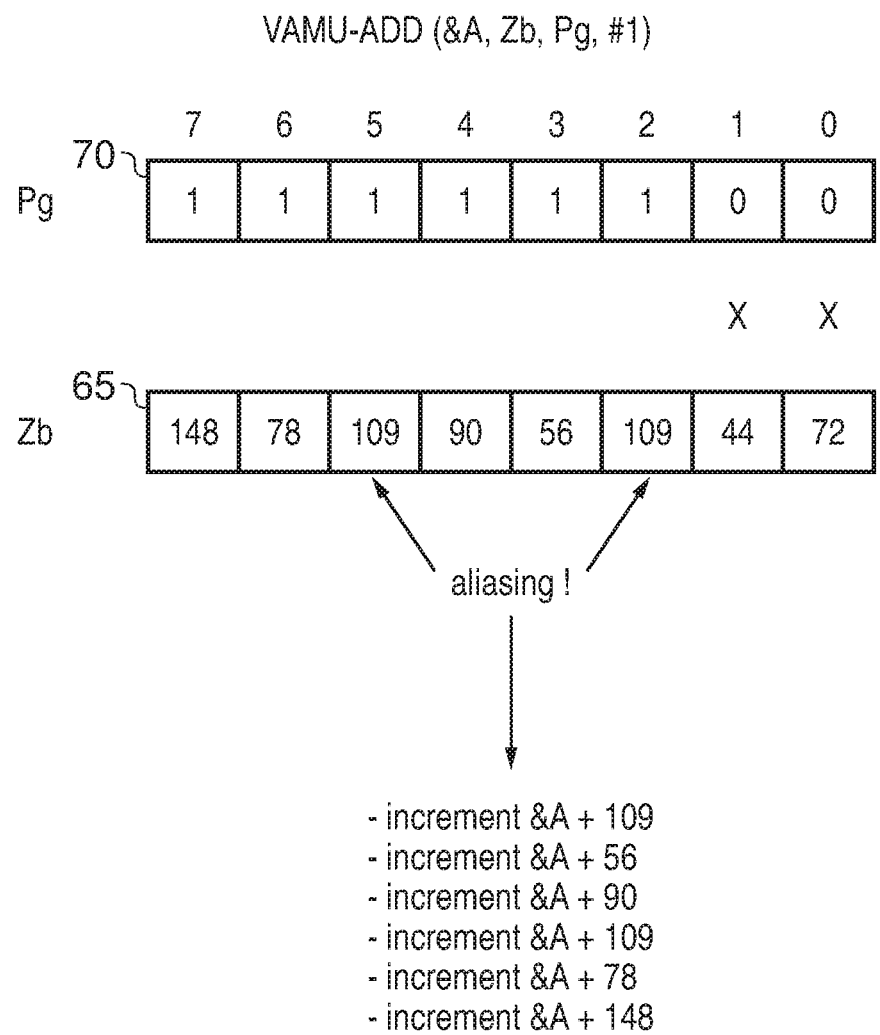
FIG. 2 illustrates an example of a vector atomic memory update instruction.

FIG. 2 shows an example of a vector AMU instruction which can be processed by the AMU unit 85. This example is an AMU add instruction which specifies as inputs a base address &A, an address vector Zb, a mask register (predicate register) Pg, and an immediate value #1 to be added. As shown in FIG. 2, the predicate register Pg contains a mask of bit values identifying which elements of the address vector Zb are active elements or inactive elements. In this example mask bit values of 0 indicate inactive elements and mask bit values of 1 indicate active elements, but it will be appreciated that the opposite mapping could be used if desired. Hence, in this example elements 0 and 1 of the address vector Zb are inactive and elements 2 to 7 are active. Each active data element of the address vector Zb specifies an address offset which is to be added to the base address &A to determine an address of a memory location for which the atomic memory update is to be performed.

Hence, as shown in FIG. 2, in response to the vector AMU instruction, for each active data element 2 to 7, the AMU unit 85 may trigger requests to the external AMU agent 100 to atomically update a series of addresses corresponding to the sum of the base address &A and each successive offset 109, 56, 90 etc. specified by the active elements 2 to 7. No requests are sent for the inactive elements 0, 1 of the address vector ZB. As shown There may be aliasing of the address offsets in different elements of the address vector Zb, so that the same address may have multiple updates applied to it in response to the vector AMU instruction. In FIG. 2, for example, elements 2 and 5 of the address vector both specify the same offset 109 and so two separate requests for updating the memory location with address &A+109 are issued.

In this example, since the vector AMU instruction is an add instruction and the immediate value is 1, each request is to increment the value stored in the memory location having the address calculated based on each respective offset. It will appreciated that other types of atomic updates could also be performed, such as adding values other than 1, subtracting a certain value from the value stored in the addressed memory location, performing a bitwise logical operation such as AND, OR, XOR, NAND etc. on the value stored in the memory location and at least one further value, setting the memory location to the maximum or minimum of the value stored in the memory location and at least further specified value, and comparing the value in the memory location with a given other value or determining whether the value meets some condition and then updating the value if the condition is met. The AMU agent 100 processes each atomic update so that it is observed as being indivisible by other processors attempting to access memory. Hence, between starting and finishing the atomic update in response to a given update request, other processors will not be able to read or write the memory location being updated, in order to ensure that no updates are lost. When there is aliasing of respective addresses within the same vector as shown in FIG. 2 then the atomic updates also ensure that the update in response to the first aliased request is complete before the second aliased request starts.

Figure 3:
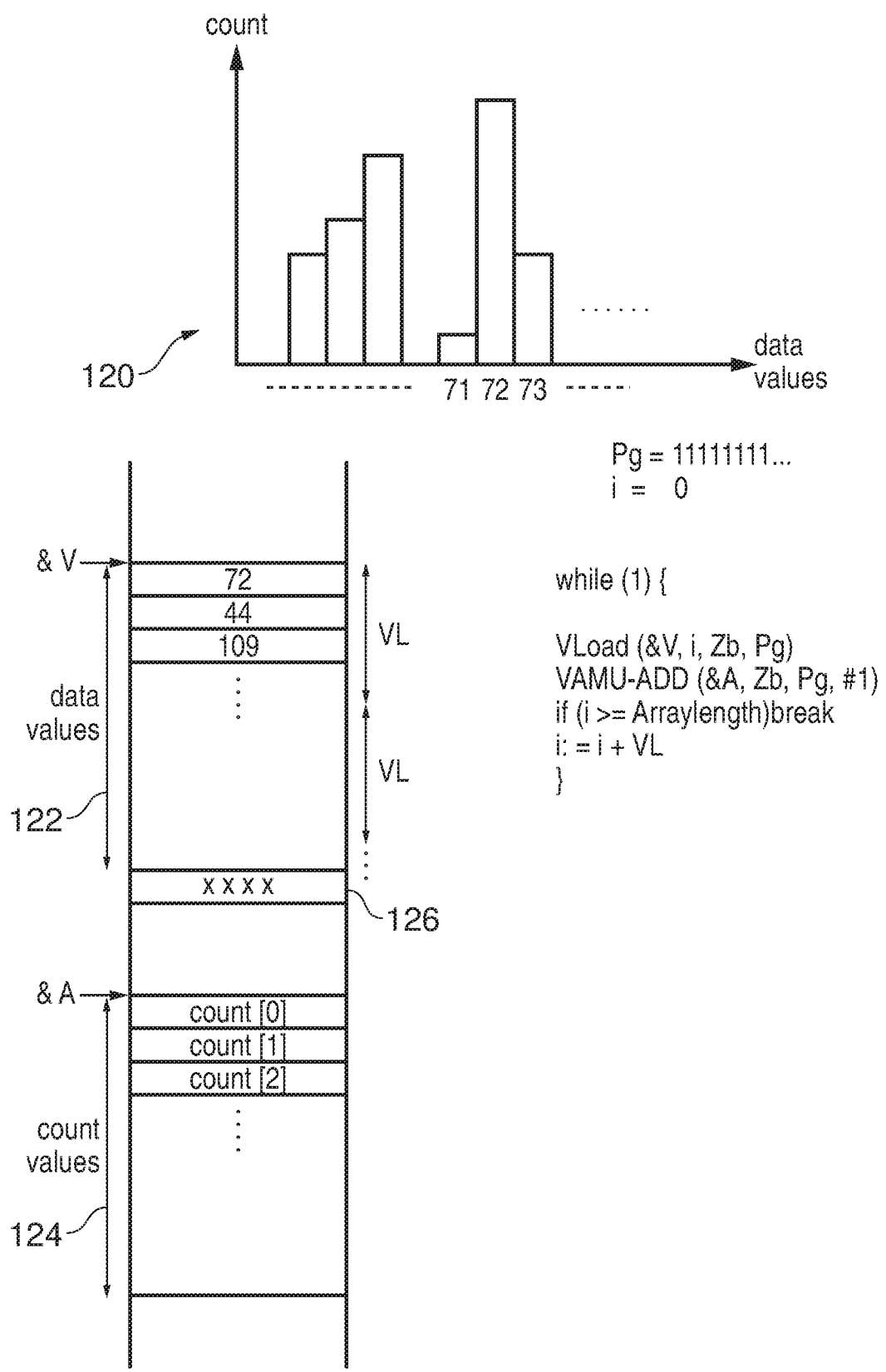
FIG. 3 shows an example of use case for using the vector atomic memory update instruction to determine a histogram.

FIG. 3 shows an example use case for vector AMU instructions of this type. For example, a programmer may wish to write some code to walk through an array of data values and count how many times each possible numeric value appears within the array. That is, the programmer may effectively wish to determine a histogram 120 as shown in the top of FIG. 3. Hence, the array of data values to be considered may be stored in memory at a block of locations 122 starting from base address &V, and another area of the memory address space 124 starting at base address &A may be allocated for storing the count values which indicate how many values of array 122 have each possible numeric value.

As shown in pseudo code on the right hand side of FIG. 3, this can be implemented using a simple loop. At each iteration of the loop, a vector load instruction (VLoad) can load the data values from the array 122 into an address vector Zb. The address of the first data value loaded into address vector Zb may be determined by adding a count offset i to the base address &V of the array 122 storing the data values. On the first iteration, the first VL elements of array 122 may be loaded into the address vector Zb, where VL is the number of elements (vector length) of the vector Zb.

Having populated the address vector, a vector AMU instruction (VAMU-ADD) of the type shown in FIG. 2 is executed, specifying base address &A indicating the start of the count array 124, address vector Zb which is the result of the vector load instruction, and an immediate value of 1 to be added to each memory location whose address is determined by adding the respective offsets in the address vector Zb to the base address &A. In this example, for simplicity the masks for the vector load and vector AMU instructions are assumed to be all 1 so that all the elements are active. Hence, in response to the vector AMU instruction the AMU unit 85 will trigger the atomic memory updating agent 100 to increment the locations within the count array 124 corresponding to the particular values accessed from the data array 122. The count value for a given numeric data value is at an offset equal to that data value (e.g. the count value representing the number of occurrences of value '72' is at offset 72 from base address &A). Hence, each time a given numeric value appears within array 122, this will trigger an increment to the corresponding count value in array 124.

Having performed the vector AMU instruction, then the counter i can be incremented by a number of addresses corresponding to the vector length VL (i:=i+VL) and then the loop starts again to fetch in the next block of VL elements into the address vector and repeat the vector AMU instruction for the next block of data values to be considered. In this way the loop can keep iterating through each successive chunk of data values corresponding to one vector length VL.

The loop may include an if statement to break the loop when the end of the data array 122 is reached. For example, the if statement may check whether the counter i is greater than or equal to the total length of the array. Alternatively, the virtual address 126 following the data array 122 in the virtual address space may store a given stop indication value XXXX (where the stop value can be any predetermined value), and an if statement could be included in the loop to break the loop when one of the elements of the address vector Zb is found to be equal to the stop value XXXX. Alternatively, some other stop condition could be defined.

In this way, the vector AMU instruction can be used to determine the histogram 120 with relatively few static instructions. It will be appreciated that FIG. 3 is a simplified example and there may be more instructions required for manipulating masks or performing more complicated operations on each element to be processed. Compared to a scalar AMU implementation, vectorising code can be more efficient since there is less need to execute a large number of instructions for individually fetching in each element of the data array 122, checking the whether the stop condition is satisfied and triggering individual type memory updates for each location. Also, unlike a scalar set of operations, the vector AMU may be able to be processed more efficiently. For example, if several elements of the vector correspond to the same cache line then these could be processed using a single request to the AMU agent 100 to update the corresponding cache line in a single operation.

However, when executing a vector atomic memory update instruction of the type shown in FIGS. 2 and 3, it is possible for the addresses calculated using the address vector Zb to trigger a fault condition, such as an address translation fault or memory protection fault. An address translation fault may be any fault signalled by the MMU 90 based on a look up of the translation data in the TLB 92. A memory protection fault may be any fault triggered by a memory protection unit which looks up permission data for physically addressed requests. For example, the MMU 90 may signal a fault if the currently executing processor does not have permission to update the address being requested, or if the address calculated for a given element of the vector corresponds to an unmapped virtual address for which no permissions have been set. Such fault conditions may typically be handled by triggering some kind of fault handling response such as a trap to the operating system or the execution of an exception handling routine which may then intervene and attempt to fix the problem. Having repaired the cause of the fault (e.g. paging in data for the unmapped page into the TLB 92), the operating system or other kind of control software may restart instructions so that it can complete. For normal vector operations it may be safe to replay the whole instruction from scratch because their operations may be idempotent.

Figure 4:
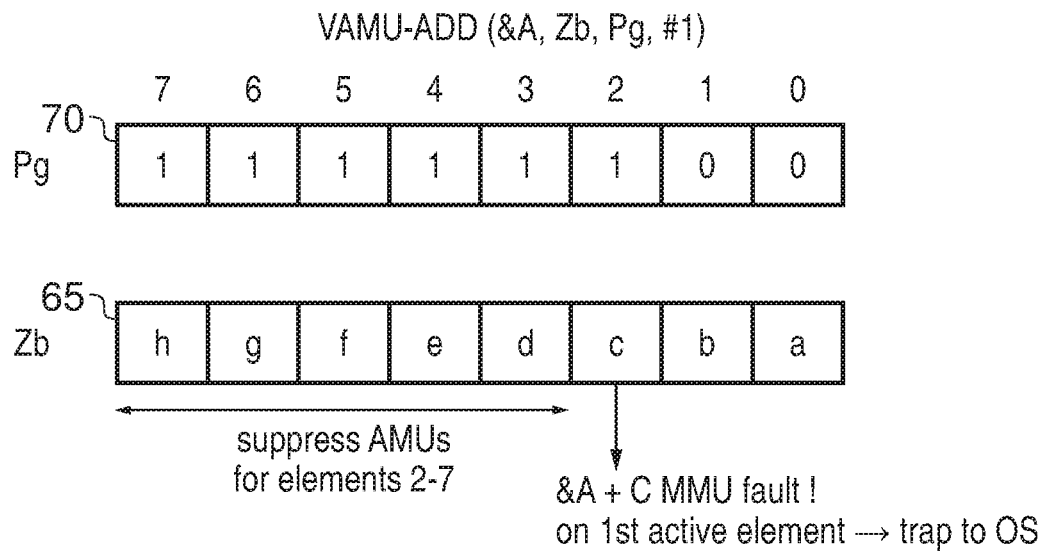
FIG. 4 illustrates an example of handling a fault condition detected for a first active data element of the vector atomic memory update instruction.
Figure 5:
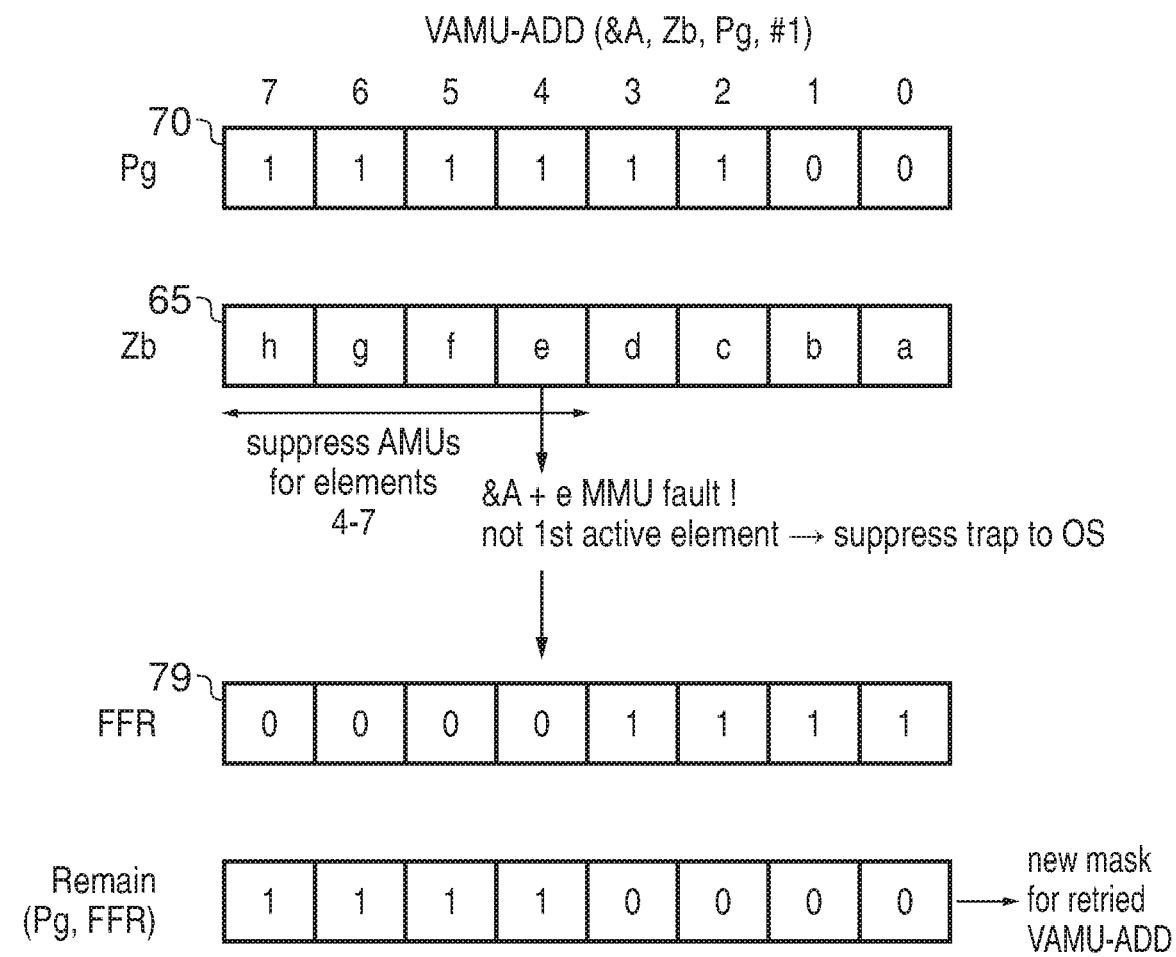
FIG. 5 shows an example of suppressing a fault handling response and storing status information in response to a fault condition being detected for an active data element other than the first active data element for the vector atomic memory update instruction.
Figure 6:
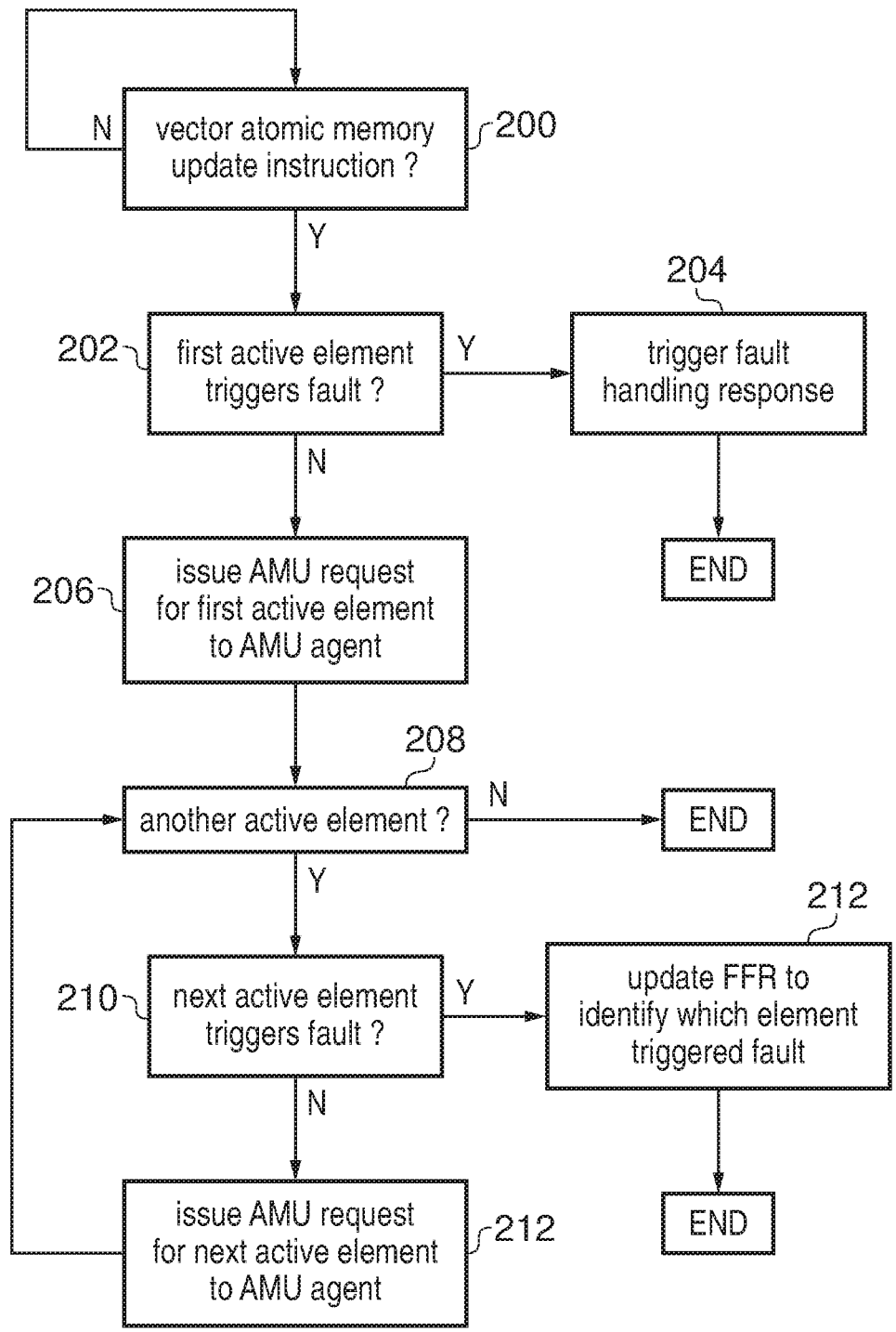
FIG. 6 is a flow diagram illustrating an example of processing the vector atomic memory update instruction.

However, vector AMU instructions of the type shown in FIGS. 2 and 3 may not be idempotent. For example, if the operations shown in FIG. 2 were repeated from scratch then any successfully completed atomic updates which were performed before the fault was identified would be performed again and so the corresponding locations in memory could be incremented more than once. This could lead to the wrong values being calculated for the histogram of FIG. 3, for example. Similar problems may arise with other types of AMU (e.g. applying a logical operation such as XOR one time too many may change the result). Hence, when a fault occurs for one or more of the addresses triggered by the vector atomic memory update instruction, it can be desirable to allow the instruction to be re-executed without repeating any of the updates which have already been performed. FIGS. 4 to 6 show an example technique for doing this.

As shown in FIG. 4, if a fault condition is detected for the first active element of the address vector, then a fault handling response, such as trapping to the operating system to allow the operating system to deal with the fault, is triggered. Also, when the fault is detected, the AMU unit 85 suppresses any AMU requests being issued to the AMU agent 100 for the active element which triggered the fault and any subsequent elements. For example, in FIG. 4 the first active element is element 2 because it is the least significant element in the vector for which the corresponding mask bit is 1. When the fault arises on element 2, then the AMU requests for elements 2 to 7 are suppressed.

On the other hand, as shown in FIG. 5, when a fault is detected for an element of the address vector which is not the first active element, then the fault handling response is suppressed. For example there is no trap to the operating system. Nevertheless, the AMU unit 85 suppresses any AMU requests being issued for the faulting element and any subsequent elements which are more significant than the faulting element. For example, in FIG. 5 the fault occurred for active element 4, and so the AMU requests for preceding active elements 2 and 3 are issued successfully, but requests for the faulting active element 4 and subsequent active elements 5 to 7 are suppressed.

As no fault handling response (e.g. no trap to the operating system) is generated, the execution of the instruction will appear to have been successful. However, to provide information about the fault, the AMU unit 85 updates the first faulting register 79 to indicate which element faulted. As shown in FIG. 5, when a fault occurs for an element other than the first active element then bits in the FFR 79 which correspond to the element that triggered the fault and any more significant elements are cleared. Hence, the FFR 79 effectively may partition the vector into a portion indicated with ones for which AMU requests were successfully issued to the AMU agent 100 and a portion indicated with bits of zero for which the AMU requests were not issued. This provides information which can enable software to determine which active elements have or have not been processed successfully and hence the point at which execution of the instruction should be restarted to avoid performing AMU operations for the same element twice. For example, as shown in the bottom of FIG. 5, a new mask for the vector AMU instruction can be generated using the FFR 79 in which any bits of the previous mask Pg which correspond to bit values of 1 in the FFR 79 are cleared so that only the remaining elements which have not yet been processed are indicated as active elements for a subsequent execution of the vector AMU instruction. For example, the application software could be written with a loop around the vector AMU instruction to iteratively execute the instruction until all its elements have been successfully updated. Some example pseudo code for this is shown below:

```
// Vector loop using the invention
// z0.d = vector of data to be atomically added to memory
// z1.d = vector of memory address elements
// p0.d = predicate of addresses to be updated
       pfalse    p1.b
retry: remain    p1.b, p0/z, p1.b   // determine remaining elements in p0
       setffr                       // initialise FFR to all true
       stadd     z0.d, p1/z, [z1.d] // atomically add z0.d to [z1.d]
       rdffrs    p1.b, p0           // read FFR and set flags
       b.nlast   retry              // retry if last element not done
```

Even if the total number of static instructions is similar to the number of static instructions required for implementing a series of scalar AMU operations for carrying out required updates, the vectorised loop of the formula shown above has a potential for hardware to improve performance based on several element updates in parallel, for example if they target the same cache line in memory. In contrast a scalar implementation would only be able to issue one element at a time.

Hence, by suppressing the atomic update operations for the faulting element and subsequent elements in the address vector when a fault is detected, triggering a fault handling response only if the first active element in the vector faults, and if an element other than the first active element triggers a fault, setting the FFR 79 to indicate which data element faulted, this enables vector AMU instructions to be safely restarted following a fault without risk of performing any of the updates more than once.

This can be particularly useful in vectorised codes such as the example of FIG. 3 where there is a loop which repeatedly executes a given vector instruction for successive blocks of data values of vector length VL. Often, the number of distinct data values to be processed may not be an exact multiple of the vector length, and so the final iteration of the loop may fetch in data values which extend beyond the end of the structure 122 which is being traversed by the loop. In this case, then in the final iteration it is more likely that some elements of the vector will correspond to address offsets which do not map within the count array 124 and so it is more likely that such address offsets may trigger address translation faults or memory protection faults. For example, the final iteration of the loop may load in data values beyond the end of the array being processed into address vector Zb and these could have large values which are offset by a large amount from the base address &A of the count array 124, and could extend into regions of the address space which the current process is not allowed to access.

Individually checking all the address offsets before executing the vector AMU instruction would introduce additional complexity and without the ability to lock translations into the TLB may still not guarantee that the addresses processed by the vector AMU instruction will not fault. Another option may be to test whether the end of the array has been reached before the vector AMU instruction has been executed. However, in some cases the stop condition for determining when the end of the array has been reached may actually depend on the update operation itself, so testing beforehand may not be possible, and in any case it may increase the number of static instructions required. By instead allowing the vector AMU instruction to execute before the stop condition is known to be satisfied, the software can be made more efficient. However, this also increases the risk of address faults. It would be undesirable to trap the OS unnecessarily when the sole cause of the address fault is that the vectorised code has stepped beyond the end of the structure it was supposed to traverse. By suppressing the fault handling response when later elements fault, if it can then be determined that the stop condition is met then it may not even be necessary to repeat the vector AMU instruction at all, since the loop of vector AMU instructions may be broken when the stop condition is found to be satisfied. If the stop condition is not yet satisfied then the fault is real, and so the vector AMU instruction can be repeated and the FFR information from register 79 can be used to update the mask so that the vector AMU operation restarts from the previously faulty element which is now indicated as the first active element.

FIG. 5 shows an example where the FFR 79 is represented in terms of a mask which partitions the successful and unsuccessful elements. However, it would also be possible to represent this in another way such as simply identifying the element number of the element which triggered the fault. Also while FIG. 5 shows an example of calculating a new mask for a repeated attempt to execute a vector atomic memory instruction, another approach may be to repeat the vector load instruction shown in FIG. 3 after updating the count value i by a number addresses corresponding to the position of the element which triggered the fault of the previous attempt, so that the address vector Zb itself is updated so that the faulty element is now in a position which corresponds to the first active element in the vector. A subsequent attempt to execute the vector AMU instruction will then start with the element previously determined to be faulty, following completion of whatever operations are performed by the operating system to resolve the fault.

Forward progress can be achieved because on each execution of the vector atomic memory update instruction, as long as the first active element is not faulty, then at least one non faulty element will be updated on each execution of the instruction. If the first active element is faulty then the trap to the operation system is triggered to resolve the fault and the instruction can be tried again as there is no risk of repeating an already performed atomic update.

Some hardware implementations may allow any number of AMU requests to be issued to the external AMU agent 100 in response to a given instruction. In this case, the AMU unit 85 may issue a request for as many elements of the address vector Zb as possible. Hence, if no fault is detected then requests may be issued for each active element indicated by the mask value Pg. If a fault is detected for at least one element then the request may be issued for all the lower numbered elements which precede the faulty element for which the fault was detected.

However, in other embodiments there may be a maximum number of AMU requests which can be issued to the AMU agent 100 in response to a given instruction. For example, limiting the number of requests to a certain number can simplify the hardware in the AMU agent 100. In this case, if a certain instruction requires more than the maximum AMU requests, then the AMU unit 85 may determine the next element which requires a further AMU request above the maximum as faulty even if the corresponding address does not actually trigger a fault in the AMU 90. The FFR 79 can then be updated to indicate this element as the first faulty element and then the same software loop provided to guard against faults may trigger repetition of the vector AMU instruction so that the atomic memory update operations for that element and any subsequent elements can be triggered in a later cycle. For example, some simpler implementations could even choose to process only the first active element of the vector on any given execution of a vector AMU instruction, and could always mark the remaining elements as faulty in the FFR 79 so that the updates for the respective elements will all be serialised with one update being performed in response to each iteration of the instruction. From a software point of view, this approach may be invisible to the programmer (other than reduced performance), but this approach can help reduce the hardware overhead of the AMU agent 100.

In the examples above, the active elements of the address vector are considered in sequence by the AMU unit 85 starting with the least significant element (e.g. element 0 if it is active) and ending with the most significant active element (e.g. element 7 in the 8-element vector example above). However, it would be possible to consider the elements in some other sequence, such as going from the most significant element to the least significant element or using an arbitrary sequence. Hence, there are other ways of determining which element is the first active element in the sequence. While the examples above show 8-element vectors for ease of explanation, the technique could be implemented with any vector length.

FIG. 6 is a flow diagram illustrating processing of a vector AMU instruction. At step 200 it is determined whether a vector AMU instruction is being executed. If not then the instruction is processed in some other way by one of the execute units 30, 35, 80, 40. When a vector AMU instruction is executed, then at step 202 the AMU unit 85 determines whether the first active element of the address vector triggers a fault condition. If so then at step 204 a fault handling response is triggered, such as generating an exception signal or an interrupt signal which triggers a corresponding a fault handling routine to be executed. For example the fault handling routine could be defined by an operating system. The processing of this instruction then ends.

On the other hand, if the first active element does not trigger a fault then at step 206 then AMU unit 85 issues a AMU request to the external AMU agent 100 requesting an atomic update to a memory location whose address is determined based on the value specified in the first active element of the address vector. For example, the target memory address could be determined by adding an offset specified by the first active element of the vector to a base address. Alternatively, the target address could be directly specified by the element of the address vector.

At step 208 the AMU unit 85 determines whether there are any other active elements to be processed. If not, then the processing of the current instruction ends. If there is another active element then at step 210 the AMU unit 85 determines whether the next active element of the address vector triggers a fault. For example this can be determined by calculating the corresponding address and looking it up in the MMU 90. If a fault is triggered by the next active element then at step 212 no fault handling response is triggered, but instead the AMU unit 85 updates the FFR 79 to identify which element triggered the fault. For example, as discussed above the AMU unit 85 may clear bits of the FFR which correspond to the next active element and any subsequent elements of the vector. Processing of the instruction then ends. If the next active element did not trigger fault then at step 212 another AMU request is issued for the address corresponding to the next active element in a similar way to step 206. The method then returns to step 208 to consider whether there is another active element to be processed.

Hence, as shown in FIG. 6 the fault handling response is triggered at step 204 only if there is a fault associated with the first active element and is suppressed if the fault occurs on other elements. Also, when a fault does occur, the AMU request for that element and any subsequent elements are suppressed. Hence, issuing of an AMU request requires that none of the previously considered elements triggered a fault. In this way the vector AMU instruction can safely be repeated later, with the mask or the address vector of the repeated vector AMU instruction being updated based on the FFR information so that the first active element for a subsequent attempt will be the element which previously triggered the fault.

As mentioned above, at step 210, the next active elements could be considered to trigger a fault even if the MMU 90 does not signal an address translation or protection fault, if the maximum number of AMU requests have already been issued in response to the current instruction.

Figure 7:
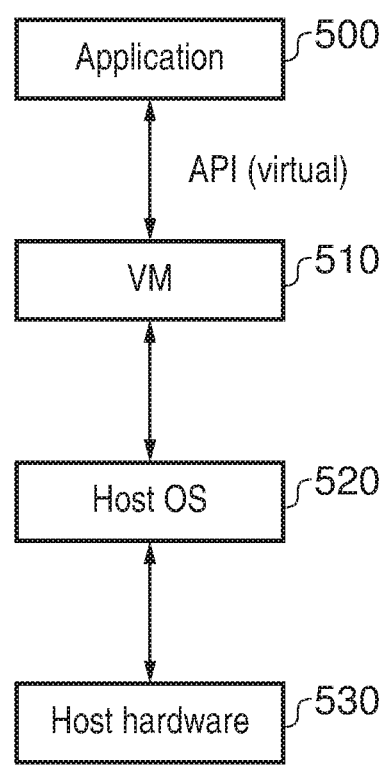
FIG. 7 shows a virtual machine implementation.

FIG. 7 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to trigger at least one atomic memory update operation in response to a single vector atomic memory update instruction identifying an address vector comprising a plurality of data elements including at least one active data element, each atomic memory update operation comprising an atomic update to a memory location having an address determined based on a corresponding active data element of the address vector, the atomic update to the memory location comprising one or more operations to update a value stored in the memory location based on a previous value stored in the memory location where the one or more operations are observed as taking place indivisibly; wherein:
the data elements of the address vector have a predetermined sequence;
in response to detecting a fault condition for the address determined based on a faulting active data element of said address vector, the processing circuitry is configured to suppress the atomic memory update operation for said faulting active data element and any subsequent active data element in the predetermined sequence;
when said faulting active data element is a first active data element in said predetermined sequence, the processing circuitry is configured to trigger a fault handling response; and
when the faulting active data element is an active data element other than said first active data element in said predetermined sequence, the processing circuitry is configured to suppress the fault handling response and to store status information indicating which data element of the address vector is the faulting active data element.

2. The apparatus according to claim 1, wherein the address vector is associated with a mask indicating which data elements of the address vector are active data elements.

3. The apparatus according to claim 2, wherein the processing circuitry is responsive to at least one further instruction to generate, based on the status information, at least one of a new address vector and a new mask for a subsequent attempt to execute a single vector atomic memory update instruction.

4. The apparatus according to claim 3, wherein the processing circuitry is responsive to said at least one further instruction to generate the new mask with the faulting active data element indicated as the first active data element in said predetermined sequence.

5. The apparatus according to claim 3, wherein the processing circuitry is responsive to said at least one further instruction to generate the new address vector with the first active data element of the new address vector having the same value as the faulting active data element in the address vector.

6. The apparatus according to claim 1, wherein the status information comprises a fault mask comprising fault indications having a first value for at least one data element preceding the faulting active data element in the predetermined sequence, and fault indications having a second value for the faulting active data element and any subsequent active data element in the predetermined sequence.

7. The apparatus according to claim 1, wherein when no fault condition is detected for the address determined based on the first active data element, the processing circuitry is configured to trigger the atomic memory update operation to be performed for each active data element of the address vector preceding the faulting active data element in the predetermined sequence.

8. The apparatus according to claim 1, wherein the processing circuitry is configured to trigger a maximum of N atomic memory update operations in response to the single vector atomic memory update instruction, and when the active data elements of the address vector require more than N atomic memory update operations to be performed, the processing circuitry is configured to determine that a given active data element in said predetermined sequence which would require an $(N+1)^{th}$ atomic memory update operation is said faulting active data element irrespective of a value of said given active data element.

9. The apparatus according to claim 1, wherein said first active data element in said predetermined sequence comprises a least significant active data element of said address vector.

10. The apparatus according to claim 1, wherein the fault condition comprises an address translation fault or memory protection fault.

11. The apparatus according to claim 1, wherein the fault handling response comprises triggering execution of a fault handling routine.

12. The apparatus according to claim 1, wherein for each atomic memory update operation, the address of the memory location corresponds to a result of adding an offset specified by the corresponding active data element of the address vector to a base address.

13. The apparatus according to claim 1, comprising memory updating circuitry to perform said at least one atomic memory update operation;
wherein in response to the single vector atomic memory update instruction, the processing circuitry is configured to trigger the at least one atomic memory update operation by issuing a request to the memory updating circuitry.

14. The apparatus according to claim 13, comprising at least one cache to store data for access by the processing circuitry;
wherein for at least one type of single vector atomic memory update instruction, the memory updating circuitry is configured to perform the atomic update to said memory location directly in memory without loading data from the memory location into said at least one cache.

15. The apparatus according to claim 1, wherein the atomic update to the memory location comprises at least one of:
adding a given value to the value stored in the memory location;
subtracting a given value from the value stored in the memory location;
performing a bitwise logical operation on the value stored in the memory location and at least one further value;
setting the memory location to a minimum or maximum of a previous value stored in the memory location and at least one further value; and
updating the value stored by the memory location if a previous value stored in the memory location meets a predetermined condition.

16. The apparatus according to claim 1, wherein the atomic memory update operation comprises loading to a register or cache at least one of:
a previous value stored in the memory location before the atomic update; and a new value stored in the memory location after the atomic update.

17. A data processing apparatus comprising:

means for performing at least one atomic memory update operation in response to a single vector atomic memory update instruction identifying an address vector comprising a plurality of data elements including at least one active data element, each atomic memory update operation comprising an atomic update to a memory location having an address determined based on a corresponding active data element of the address vector, the atomic update to the memory location comprising one or more operations to update a value stored in the memory location based on the value stored in the memory location where the one or more operations are observed as taking place indivisibly; wherein:

the data elements of the address vector have a predetermined sequence;

in response to detecting a fault condition for the address determined based on a faulting active data element of said address vector, the means for performing is configured to suppress the atomic memory update operation for said faulting active data element and any subsequent active data element in the predetermined sequence;

when said faulting active data element is a first active data element in said predetermined sequence, the means for performing is configured to trigger a fault handling response; and when the faulting active data element is an active data element other than said first active data element in said predetermined sequence, the means for performing is configured to suppress the fault handling response and to store status information indicating which data element of the address vector is the faulting active data element.

18. A data processing method comprising:

triggering at least one atomic memory update operation in response to a single vector atomic memory update instruction identifying an address vector comprising a plurality of data elements including at least one active data element, each atomic memory update operation comprising an atomic update to a memory location having an address determined based on a corresponding active data element of the address vector, wherein the data elements of the address vector have a predetermined sequence, the atomic update to the memory location comprising one or more operations to update a value stored in the memory location based on the value stored in the memory location where the one or more operations are observed as taking place indivisibly;

in response to detecting a fault condition for the address determined based on a faulting active data element of said address vector, suppressing the atomic memory update operation for said faulting active data element and any subsequent active data element in the predetermined sequence;

when said faulting active data element is a first active data element in said predetermined sequence, triggering a fault handling response; and when the faulting active data element is an active data element other than said first active data element in said predetermined sequence, suppressing said fault handling response and storing status information indicating which data element of the address vector is the faulting active data element.

19. A computer program stored on a non-transitory computer readable storage medium that, when executed by a data processing apparatus, provides a virtual machine which provides an instruction execution environment corresponding to the apparatus of claim 1.

* * * * *